United States Patent [19]
Oshima

[11] Patent Number: 5,448,488
[45] Date of Patent: Sep. 5, 1995

[54] COMPUTER-CONTROLLED INDIVIDUAL CHIP MANAGEMENT SYSTEM FOR PROCESSING WAFERS

[75] Inventor: Takefumi Oshima, Kanagawa, Japan

[73] Assignee: Sony Corporation, Tokyo, Japan

[21] Appl. No.: 202,157

[22] Filed: Feb. 25, 1994

[30] Foreign Application Priority Data

Feb. 26, 1993 [JP] Japan .................................. 5-062783

[51] Int. Cl.6 ............................................. G05B 19/18
[52] U.S. Cl. .................... 364/468; 364/490; 364/491; 437/54
[58] Field of Search ....................... 364/468, 490, 491; 437/8, 51, 54; 430/5

[56] References Cited

U.S. PATENT DOCUMENTS

| | | | |
|---|---|---|---|
| 3,842,491 | 10/1974 | Depuy et al. | 437/8 |
| 4,343,877 | 8/1982 | Chiang | 430/5 |
| 4,571,685 | 2/1986 | Kamushida | 364/468 |
| 4,967,146 | 10/1990 | Morgan et al. | 437/8 |

Primary Examiner—James P. Trammell
Attorney, Agent, or Firm—Hill, Steadman & Simpson

[57] ABSTRACT

Chips formed on respective wafers are numbered. A map in which chip positions are correlated with chip numbers is created. A process is specified for each individual chip. A host computer creates processing information from inputted lot information for each individual chip and supplies the created processing information to a processing apparatus. A terminal for receiving various kinds of information, a line terminal, a processing information storage means for storing processing information, and a line interior information storage means are connected to the host computer. Also, a chip-managing computer is connected to the host computer. This chip-managing computer creates maps of chips formed on wafers and creates map information in which device information is correlated with chip numbers assigned to respective chips. A chip information storage means for storing the map information is connected to the chip-managing computer.

4 Claims, 5 Drawing Sheets

COMPUTER-CONTROLLED INDIVIDUAL CHIP MANAGEMENT SYSTEM FOR PROCESSING WAFERS

BACKGROUND OF THE INVENTION

1. Field of the Invention

The present invention relates to a production management system used in fabricating semiconductor devices and, more particularly, to-a chip management system which controls the production of each individual chip mounted on a wafer and needs differing types of processing information, a method of processing inputs thereto, and a lot processing system therefor.

2. Description of the Related Art

In conventional production management systems for controlling the production of semiconductor devices, since software is used to manage production facilities and processing apparatuses such as measuring instruments on a lot basis, production management systems manage production chiefly on a lot basis. In recent years, systems which manage production on a wafer basis have also been considered.

In the input processing method and lot processing method according to the above-described production management system, where production is managed on a lot basis, production processes are previously stored in a host computer or a storage means connected to the host computer. The host computer selects processing conditions according to each lot number and operating conditions from the stored production processes and informs a processing apparatus of the selected processing conditions. When processing for each lot ends, the processing history in the processing apparatus is stored in a storage means via the host computer.

In the production management system described above, the structures of the storage means, control means, and so on constituting the production management system are determined by the unit of objects which are under production control and also by output information. For example, in a production management system where production is controlled on a lot basis, a plurality of wafers in a lot cannot be controlled individually. Similarly, in a production management system designed to control a plurality of wafers individually, individual chips on wafers cannot be managed individually.

For example, in a production management system for managing production on a lot basis, individual wafers in a lot cannot be controlled. That is, their individual processing conditions, processing histories, etc. cannot be managed if the processing conditions for individual wafers differ. For instance, when instructions regarding processing conditions for individual wafers need to be given, the processing conditions for the individual wafers are added, in the form of messages, to information which is used to manage the lot. When the relevant process is performed, the wafers are processed according to the messages. Since the messages are not created by the production management system, what is controlled by the production management system cannot be extended to the processing histories of each of the wafers.

Due to increases in the diameters of processed wafers and the subsequent reduction in the amount processed per batch by processing apparatuses, (for example, reductions which shift processing from batch processing to individual sheet processing, or from individual sheet processing to processing of portions of wafers), and further, due to production of small numbers of various kinds of components (e.g. production of ASICs [application specific integrated circuits]), production management for individual chips mounted on each wafer is required.

SUMMARY OF THE INVENTION

It is an object of the present invention to provide a chip management system, input processing method, and lot processing method for satisfying the requirement described above.

This novel chip management system is intended to manage production of a wafer holding plural chips each of which requires a different kind of processing information. In this system, a first terminal for receiving lot information, device information, processing information, and chip position information is connected to a host computer. This host computer conveys processing information about each chip formed on a wafer, based on the inputted lot information, to a processing apparatus. Furthermore, a processing information storage means for storing the processing information and a line interior information storage means for storing line interior information are connected to the host computer. In addition, a chip-managing computer which creates a map of the chips formed on the wafer from the lot information, the device information, and the chip position information is connected to the host computer. This chip-managing computer assigns numbers to the chips and creates map information in which device information is correlated to respective chip numbers. A chip information storage means for storing the map information is connected to the chip-managing computer.

The first terminal may receive chip size information regarding the sizes of chips for individual devices, as well as lot information, device information, processing information, and chip position information. The chip-managing computer may also create maps of chips formed on wafers from the lot information, the device information, the chip position information, and the chip size information. Additionally, the chip-managing computer may assign numbers to the chips and create map information in which device information is correlated with corresponding chip numbers.

A method of processing inputs to the chip management system described above consists of seven procedures. In the first procedure, the lot information is entered into the host computer through the first terminal and stored in the line interior information storage means. In the second procedure, the device information regarding devices fabricated on a wafer is supplied to the host computer via the first terminal. In the third procedure, the host computer selects processes to be applied to the devices from the processing information stored in the processing information storage means according to the device information. In the fourth procedure, device names and process names are stored in the line interior information storage means. Processing conditions are read from the processing information storage means according to process names and stored in the line interior information storage means. In the fifth procedure, the chip-managing computer performs a mapping operation to determine the coordinates of the chips formed on a wafer according to various kinds of information received via the first terminal. In the sixth procedure, the chip-managing computer assigns numbers to the chips for which mapping has been performed and creates map information in which device names are correlated to the chip numbers. In the seventh procedure, the map information is stored in the chip information storage means.

As a lot management method consisting of four steps, a first step consists of the host computer taking information about the lot on the processing apparatus from the lot number. The chip-managing computer searches for the device names of devices formed on wafers in this lot and for the positions of the chips on the wafers, using the chip numbers as keywords. Then, in the second step, the host computer searches for the process names for the chips, based on the device names, and reads processing information. In the third step, the processing information fetched by the host computer is supplied as instructions regarding processing information to the processing apparatus or to a line terminal. Subsequently, in the fourth step, the chips formed on the wafers in the lot are processed by the processing apparatus according to the processing information.

The aforementioned chip management system performs mapping operations about the chips on the wafers and connects the chip-managing computer with the host computer. This chip-managing computer assigns numbers to the chips and creates maps in which the numbers are related to the device information. Also, chip information storage means for storing the map information is provided. The host computer gives instructions regarding processing information to the processing apparatus, the processing information differing from chip to chip. For example, in the case of an exposure step, different resist films can be exposed under different conditions, using a different photomask for each chip. In an annealing step, annealing is conducted by the use of a beam of energetic ions to anneal only some chips on a wafer. The annealing conditions can be varied among the chips.

It is another object of the invention to provide a chip management system, input processing method, and lot processing method for managing production of components such as semiconductor chips on a wafer in a different manner for each component requiring a different process.

A first terminal for receiving lot information, device information, processing information, chip position information, and chip size information is provided. Also, a chip-managing computer for creating map information about chips on wafers from various kinds of information supplied to the first terminal is provided. Thus, mapping operations can be performed on wafers holding chips of different sizes. Numbers are assigned to the chips so that, if chips of different sizes are installed on a wafer, a processing apparatus is instructed to process the individual chips under different conditions according to the chip numbers. In the method of processing inputs to the chip management system described above, the chip-managing computer performs mapping operations to determine the coordinates of chips formed on wafers, and creates map information in which the chip numbers are related to their respective device names. Information about the maps is stored in the chip information storage means, whereby the device names are correlated to the chip numbers for individual chips. In this way, device names are searched for based on the chip numbers, process names are read out using the device names, and processing information corresponding to the process names is specified. Therefore, processing information which differs among chips is supplied as instructions to the processing apparatus.

In the lot processing method described above, lot information is recognized from lot numbers. Device names and chip positions on wafers are searched for using the chip numbers as keywords. Subsequently, the corresponding process names for the chips are searched for based on device names, and processing information is read out. This information is supplied as instructions to the processing apparatus or to the line terminal, whereafter the chips are processed according to these instructions. In this way, each different chip on a wafer can be processed in a different manner.

Other objects and features of the invention will become clear during the following description thereof.

DETAILED DESCRIPTION OF THE PREFERRED EMBODIMENTS

Figure 1:
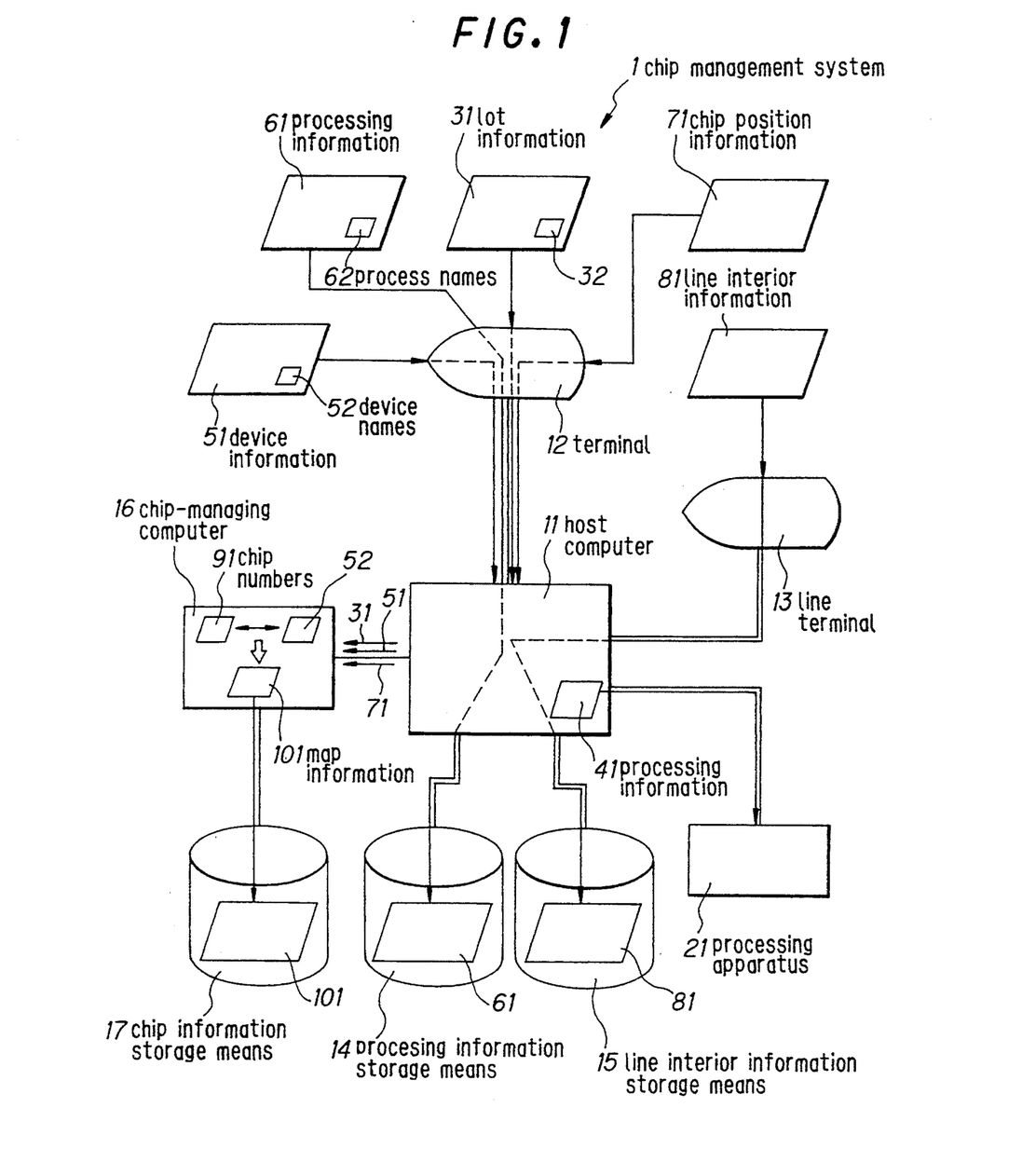
FIG. 1 is a diagram illustrating a computer-controlled management system according to the present invention.

Referring to FIG. 1, a computer-controlled chip management system embodying the concept of the present invention is shown. Lot information, indicated by numeral 31, is input to the chip management system, indicated by numeral 1. A host computer 11 supplies information about processing (hereinafter referred to as the processing information 41) as instructions to a manufacturing machine, a measuring instrument, or other processing machine or apparatus 21, for each individual chip formed on wafers (not shown). A terminal 12 for receiving the lot information 31, device information 51, processing information 61, and chip position information 71 is connected to the host computer 11. A line terminal 13 for receiving information (hereinafter referred to as the line interior information 81) about a production line is connected to the host computer.

The lot information 31 described above contains numbers assigned to lots, number of wafers, numbers assigned to the wafers and the like. The processing information 41 contains working step names and working conditions. The device information 51 contains device names, device chip sizes, and the number of manufactured chips. As an example, this device information 51 contains device names 52 as keywords. The processing information 61 contains process names, step names, and processing conditions. For example, the processing information 61 contains process names 62 as keywords. The chip position information 71 indicates the addresses of chips on a wafer. The line interior information 81 consists of data about conditions under which the processing apparatus 21 performs processing and data about the results of measurements.

A processing information storage means 14 for storing the processing information 61 entered from the line terminal 13 through the host computer 11 is connected to the host computer 11. Furthermore, a line interior information storage means 15 for storing the line interior information 81 entered from one or both of the line terminal 13 and the processing apparatus 21 through the host computer 11 is connected to the computer 11.

Further, a chip-managing computer 16 is connected to the host computer 11. This managing computer 16 acts to perform mapping operations on wafers according to the lot information 31, the device information 51, and the chip position information 71. The managing computer 16 also assigns numbers to the chips and creates map information 101 while correlating the device names 52 contained in the device information 51 with their respective chip numbers 91.

A chip information storage means 17 for storing the map information 101 is connected to the chip-managing computer 16. In this way, the chip management system 1 is constructed.

The above-described connections may be made with or without wires. Also, wired connections and wireless connections may be jointly used.

In the chip management system 1 described above, the chip-managing computer 16 connected to the host computer 11 performs mapping on chips formed on wafers according to the lot information 31, the device information 51, the chip position information 71, and other information. Also, the chip-managing computer 16 assigns numbers to the chips and creates map information in which the chip numbers 91 are related to the device information 51. The created map information 101 is stored in the chip information storage means 17.

For example, when wafers in a lot are installed on the processing apparatus 21, the host computer 11 detects the state of each wafer in this lot from the lot number 32 given to the lot on the processing apparatus 21. The host computer 11 instructs the chip-managing computer 16 to search the chip information storage means 17 for the device names 52 of the chips formed on each wafer and for their positions on the wafers while using the chip numbers 91 as keywords. Device names 52 corresponding to the chip numbers 91 are found.

Then, the processing information storage means 14 is searched for the process names 62 for the chips while using the device names 52 as keywords. Since the process names 62 are contained as keywords in the processing information 61, the processing information 61 is read out according to the process names 62. The results are displayed on the line terminal 13 or sent as the processing information 41 to the processing apparatus 21. When the results are displayed on the line terminal 13, the operator enters the processing information 41 into the processing apparatus 21 to process the wafers according to the information. When the processing information 41 is directly entered into the processing apparatus 21, the wafers are processed according to this entered processing information 41.

In this way, the host computer 11 reads out the map information 101 via the chip-managing computer 16, and the processing information 41 is sent to the processing apparatus 21 so that each different chip may be processed under different conditions. For example, in an exposure step, a resist film is exposed under different conditions, using a different photomask, for each different chip. In an annealing step, annealing is conducted by the use of an energy beam, for example, to anneal only some chips on a wafer. The annealing conditions can be varied from chip to chip.

A second embodiment of the present invention is described below. The manner in which the coordinates of chips are determined by the chip management system 1 described above is described now by referring to FIG. 2. A plurality of chips 122 (122-1, 122-2, 122-3, etc.) are formed on a wafer 121. Usually, streets 123 are formed between the successive chips 122. Therefore, in order to determine the coordinates of the chips 122, it is necessary to determine the interval a between the chips in the y-direction, the interval b between the chips in the x-direction, and a reference chip 122-1.

Figure 2:
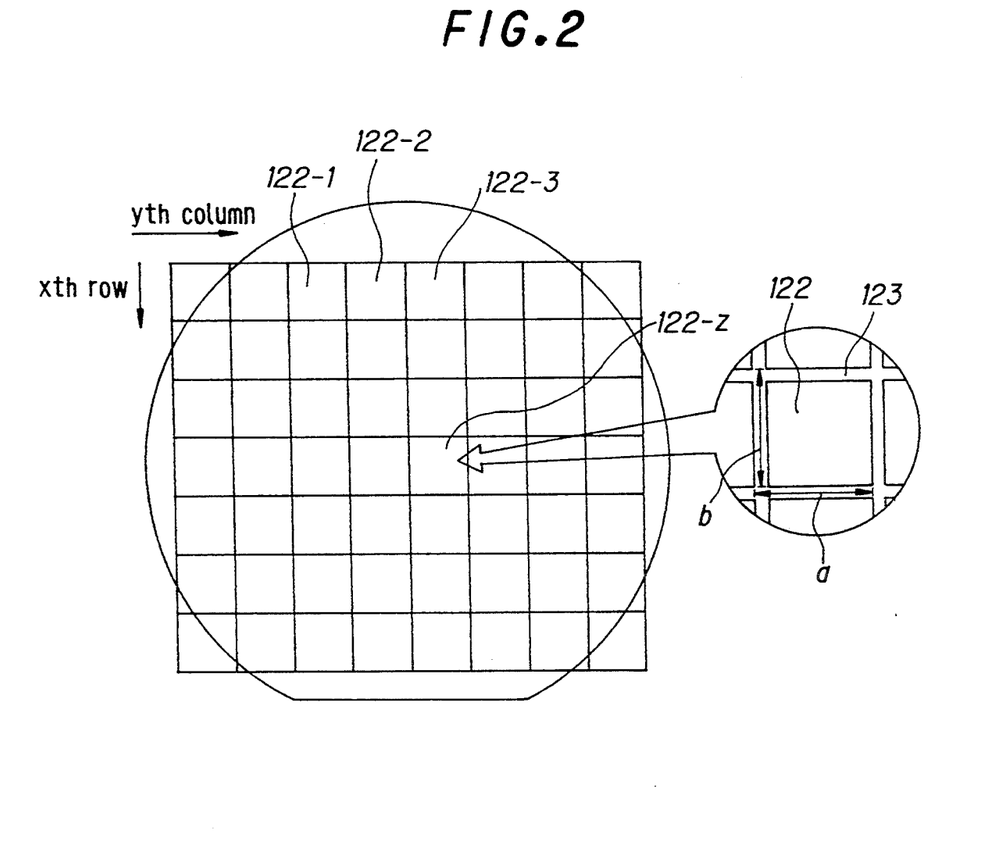
FIG. 2 is a plan view of a wafer, illustrating a chip-numbering method according to the invention.

When the chips 122 are numbered, a chip located in the xth row and the yth column is represented as the zth chip (122-z). Therefore, the lot information 31 contains the chip numbers z, as well as the lot numbers, the number of wafers, and the wafer numbers described previously. If the chip numbers z can represent the lot numbers, the number of wafers, and the wafer numbers, then these items of information can be omitted.

The data used for positioning can be coordinates of chips held by one stepper in the processing apparatus.

A third embodiment of the present invention is described next. In the chip management system 1 described above, where plural devices are installed on a wafer and have different chip sizes, it is necessary to enter information about the chip sizes of each individual device into the chip-managing computer 16. One example of this is illustrated as a third embodiment in FIG. 3. This chip management system, indicated by reference numeral 2, is similar in structure to the chip management system 1 already described in connection with FIG. 1. In particular, a terminal 12 and a line terminal 13 for entering line interior information 81 are connected to a host computer 11. A processing information storage means 14 for storing processing information 61 and a line interior information storage means 15 are connected to the host computer. A processing apparatus 21 is connected to the host computer 11 on-line. This processing apparatus 21 is operated according to processing information 41 produced by the host computer 11. The chip-managing computer 16 for creating map information 101 is also connected to the host computer 11. A chip information storage means 17 for storing the map information 101 is connected to the chip-managing computer 16.

Figure 3:
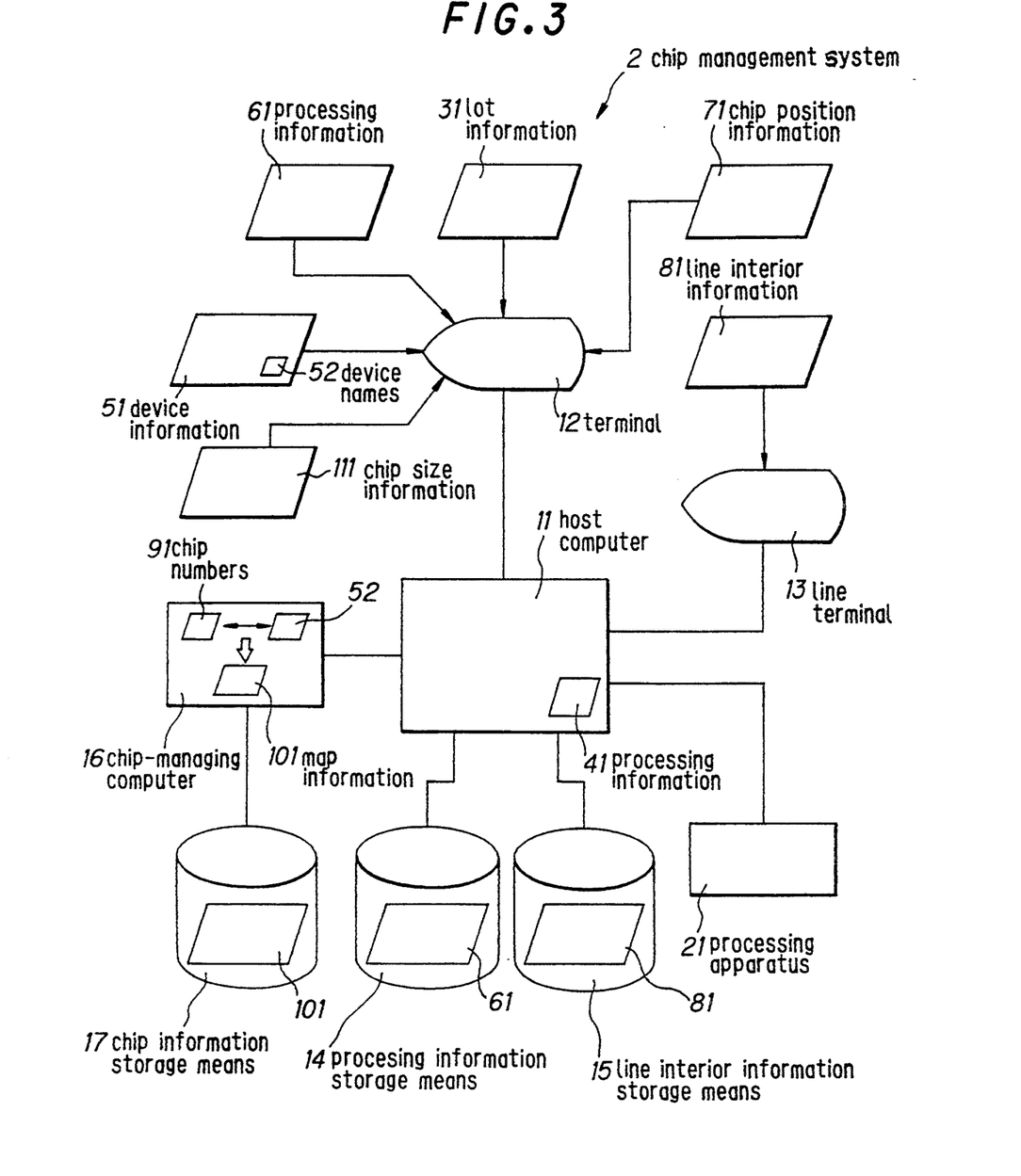
FIG. 3 is a diagram similar to FIG. 1, but illustrating another computer-controlled management system according to the invention.

In the present chip management system 2, the terminal 12 receives lot information 31, device information 51, processing information 61, and the chip position information 71. Also, the terminal 12 receives information 111 about the chip sizes of each individual device. The chip-managing computer 16 performs mapping on chips formed on wafers according to the lot information 31, the device information 51, the chip position information 71, and the chip size information 111. Also, the chip-managing computer 16 assigns numbers to the chips and creates map information 101 in which the chip numbers 91 are related to their respective device names 52 contained in the device information 51.

In the chip management system 2 described above, the terminal 12 serves to receive the information 111 concerning the chip sizes of each individual device. The chip-managing computer 16 functions to create map information, taking account of the chip size information 111. Thus, mapping can be performed even about a wafer holding chips of different sizes, and the chips are numbered. If chips of different sizes are installed on a wafer, the chip size information 111 is correlated to each individual chip. This assures that the positions of the chips on the wafer are determined. Consequently, processing information 41 corresponding to the chip numbers 91 can be supplied to the processing apparatus 21.

In either the chip management system 1 or 2, information about the histories of the chips processed by the processing apparatus 21, the processing conditions, the results of processing, and so on can be stored as line interior information 81 in the line interior information storage means 15 via the host computer 11. Accordingly, the host computer 11 can recognize the condition of each chip by searching the line interior information storage means 15 for the line interior information 81. By taking the current state of each chip into consideration, accurate processing conditions can be provided for each chip when the processing information 41 is supplied to the processing apparatus 21.

A fourth embodiment of the present invention will now be described. A method of processing inputs to the chip management system 1 or 2 described in connection with FIG. 1 or 3, respectively, is described now by referring to the flowchart of FIG. 4. It is to be noted that like components are indicated by like reference numerals in various figures.

Figure 4:
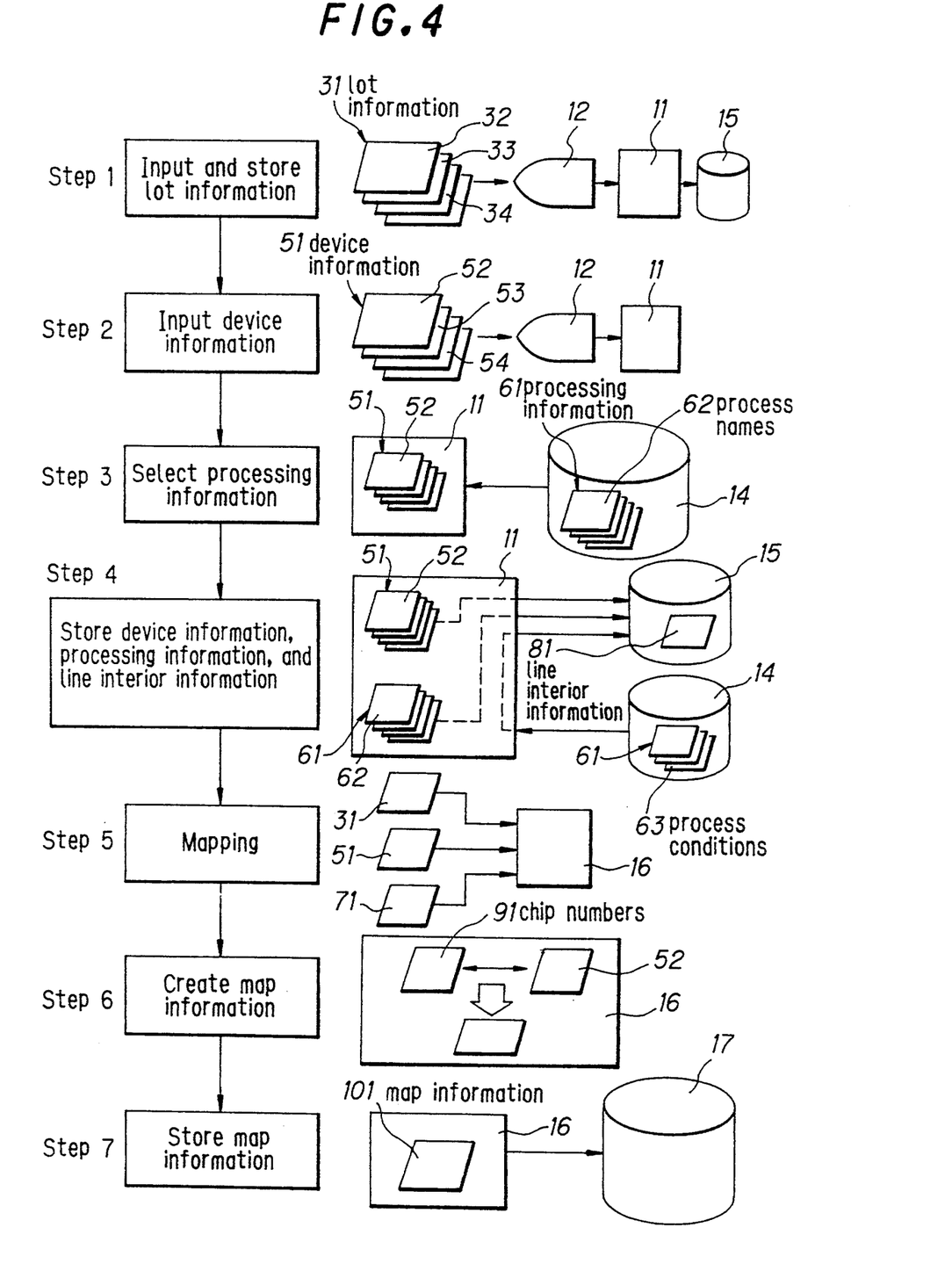
FIG. 4 is a flowchart illustrating a method of processing inputs to a chip management system according to the invention.

In step 1, lot information is entered and stored. Lot information 31 regarding chips in a lot introduced to a production line is entered into the host computer 11 via the terminal 12. The lot information 31 contains lot numbers 32, the number of wafers 33 and wafer numbers 34, and is stored in the line interior information storage means 15. The numbering of the wafers can be automatically performed in the order in which they are input.

In step 2, device information is entered. The device information 51 regarding devices manufactured on wafers is entered into the host computer 11 through the terminal 12 and contains device names 52, device chip sizes 53, and the number of manufactured device chips 54. The terminal 12 can receive information about numerous kinds of devices.

In step 3, processing information is selected. The processing information 61 is previously stored in the processing information storage means 14. The host computer 11 reads those processes from the storage means 14 which are to be applied to the respective devices, according to the device information 51 entered in step 2. For example, corresponding process names 62 are read out taking the device names 52 as keywords.

In step 4, device information, processing information, and line interior information are stored. The device names 52 which are keywords of the device information 51 are stored in the line interior information storage means 15. Also, the process names 62 which are keywords of the processing information 61 assigned to the respective devices are stored in the storage means 15. Information about processing already done on the lot is previously stored as line interior information 81 in the line interior information storage means 15. The host computer 11 reads processing conditions 63 contained in the processing information 61 from the processing information storage means 14 and stores the processing conditions 63 in the line interior information storage means 15.

In step 5, mapping is performed. The chip-managing computer 16 determines the coordinates of chips formed on wafers from the lot information 31, the device information 51, and the chip position information 71.

In step 6, map information is created. The chip-managing computer 16 numbers chips for which mapping has been performed, to correlate the chip numbers 91 with their respective device names 52. Thus, map information 101 is created.

If the chips differ in size, then the chip size information 111 already described in conjunction with FIG. 3 is entered into the chip-managing computer 16 through the terminal 12 in the above-described step 5. The coordinates of the chips formed on the wafers are determined from the chip size information 111, the wafer information 31, and the device information 51. In step 6, numbers are assigned to the chips. The chip numbers 91 are correlated with the device names 52, and map information is created.

In step 7, the map information is stored. The map information 101 created as described above is stored in the chip information storage means 17.

In the method of processing inputs to the above-described chip management system, the chip-managing computer 16 performs mapping to determine the coordinates of the chips formed on the wafer. The chip numbers 91 assigned to the chips are correlated to the device names 52. Thus, map information 101 is created and stored in the chip information storage means 17. In consequence, the device names 52 are correlated with the chip numbers for individual chips.

A fifth embodiment of the present invention will now be described. The manner in which a wafer is processed according to the above-described map information 101 is described by referring to the flowchart of FIG. 5 which illustrates processing of chips in a lot. As already described, like components are denoted by like reference numerals in the figures.

Figure 5:
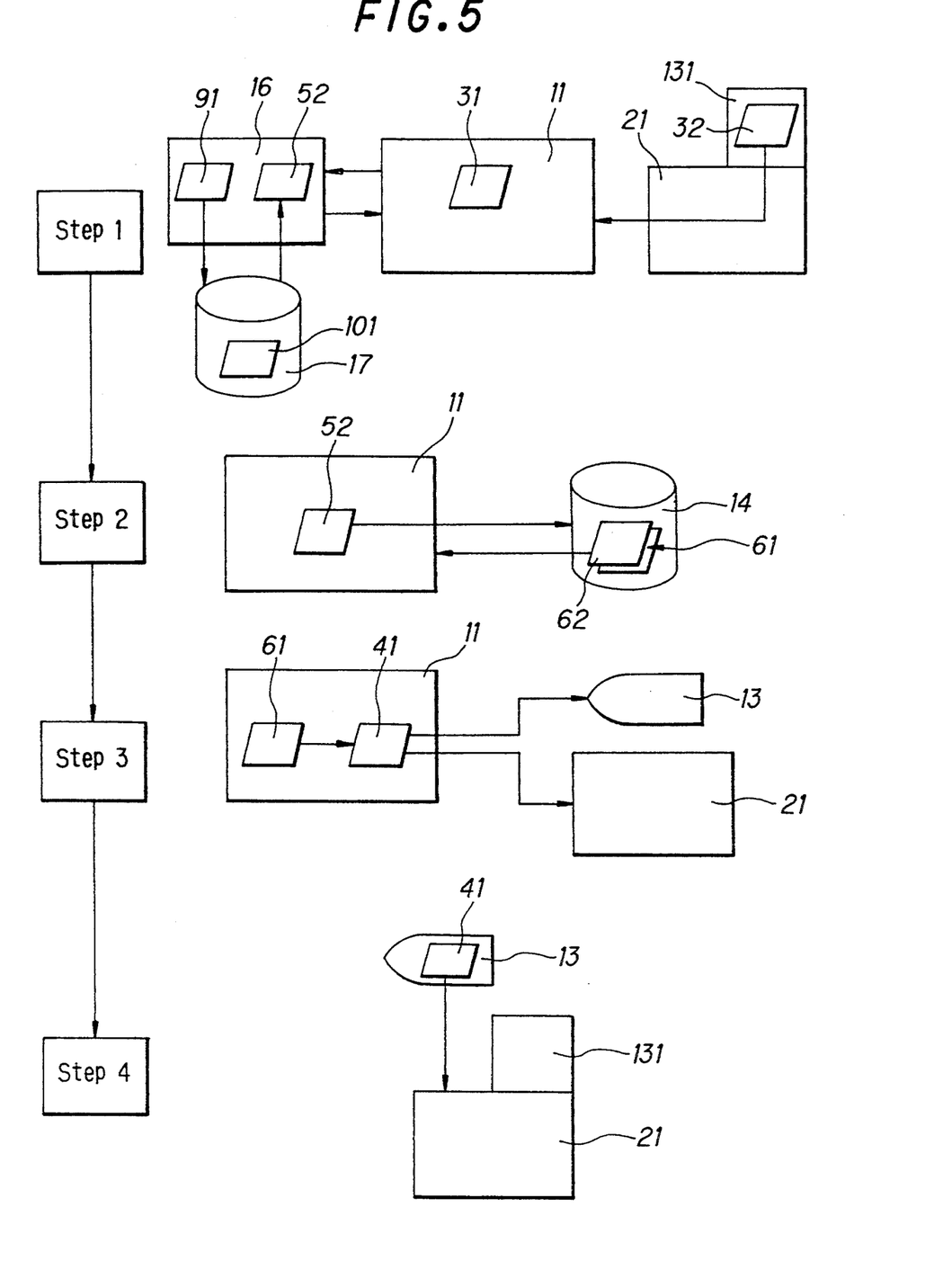
FIG. 5 is a flowchart illustrating another method of processing inputs to a chip management system according to the invention.

In step 1, when chips in a lot 131 are conveyed to the processing apparatus 21, the host computer 11 recognizes lot information 31 from the lot number 32 given to the lot 131 introduced into the processing apparatus 21. The computer 11 recognizes the state of each wafer inside the lot 131 from the lot information 31. According to the map information 101 which has been previously stored in the chip information storage means 17, the host computer orders the chip-managing computer 16 to search the chip information storage means 17 for the device names 52 formed on each wafer and for the chip positions on the wafers, using the chip numbers 91 as keywords. As a result, device names 52 corresponding to the chip numbers 91 are found. Then, the host computer 11 reads out the device names 52 correlated with the chip numbers 91.

In step 2, using the device names 52 as keywords, the host computer 11 searches the processing information storage means 14 for the process names 62 of the chips. Since the process names 62 are keywords of the processing information 61, the processing information 61 is extracted based on the process names 62.

In step 3, the host computer 11 displays the processing information 61 as processing information 41 on the line terminal 13 or supplies the information to the processing apparatus 21.

In step 4, if the information is displayed on the line terminal 13, the operator enters the processing information 41 into the processing apparatus 21 so that wafers may be processed according to the information. If the processing information 41 is directly supplied to the processing apparatus 21, then chips on wafers in the present lot 131 are processed according to the processing information 41.

In the method of processing the lot by means of the chip management system, the device names 52 are searched for according to the chip numbers 91. The corresponding process names 62 are read out, and the processing information 61 is specified. Therefore, processing information which differs among chips is supplied as processing information 41 to the processing apparatus 21. As described thus far, in the novel chip management system of the present invention, mapping for the chips formed on the wafers is performed. A chip-managing computer is connected to a host computer. This chip-managing computer numbers the chips and creates map information in which the chip numbers are correlated with device information. Furthermore, a chip information storage means for storing the map information is provided Therefore, processing information about conditions which differ among chips can be sent to a processing apparatus via the host computer, allowing processing conditions to be varied from chip to chip. In this way, production can be managed for each individual chip and consequently a small number of chips of numerous kinds can be manufactured on a single wafer.

In this novel data entry method for a chip management system, a chip-managing computer performs mapping to determine the coordinates of chips on a wafer. The chip numbers assigned to the chips are correlated with the device names, and map information is created and stored in a chip information storage means. This makes it possible to search for the device names, using chip numbers. The host computer searches for the process names, using the device names, and can specify processing information. Consequently, the processing information can be specified using the chip numbers and hence processing information which differs among chips can be supplied as processing information to a processing apparatus.

In the novel method for processing lots by a chip management system, lot information is recognized from lot numbers. Device names and the positions of chips on wafers are searched using the device names. Processing information is read out using the device names and thus the process names for the chips. The fetched information is supplied as processing information to the processing apparatus or to a line terminal and then chips are processed. Hence, each individual chip can be processed in a different manner on a wafer.

What is claimed is:

1. A chip-managing system for managing production of wafers on each of which a plurality of chips requiring different kinds of processing information are mounted, said chip-managing system comprising:

a first terminal for receiving lot information, device information, processing information, and chip position information;

a line terminal for receiving production line interior information;

a processing apparatus for processing chips in a lot;

a host computer, to which said first terminal and said line terminal are connected, for creating information concerning a processing of each individual chip from said lot information entered into said host computer and supplying the created information to said processing apparatus;

a processing information storage means connected to said host computer and serving to receive the processing information input from said first terminal via said host computer and to store said processing information;

a line interior information storage means connected to said host computer and serving to receive line interior information input from said line terminal via said host computer and to store said line interior information;

a chip-managing computer connected to said host computer and serving to create maps of the chips on said wafers from said lot information, said device information and said chip position information and to number said chips so as to correlate the device information with respective chip numbers, for creating map information; and a chip information storage means connected to said chip-managing computer and serving to store said map information.

2. The chip-managing system according to claim 1, wherein said first terminal receives said lot information, said device information, said processing information, and said chip position information, as well as chip size information about sizes of chips for each individual device, and wherein said chip-managing computer performs mapping on each wafer according to said lot information, said device information, said chip position information, and said chip size information, numbers said chips, and correlates said device information with chip numbers.

3. A method of processing inputs to a chip-managing system as set forth in claim 1 or 2, said method comprising the steps of:

inputting lot information about chips in a lot introduced to a production line into said host computer from said first terminal and storing said lot information in said line interior information storage means;

inputting device information about devices manufactured on wafers into said host computer from said first terminal;

instructing said host computer to search said processing information storage means for processes to be applied to respective devices using the inputted device information, and to read information about said processes, said processing information storage means having processing information previously stored therein;

storing device names contained in said device information and process names contained in the processing information assigned to their respective devices in said line interior information storage means, reading processing conditions from said processing information storage means, and storing said processing conditions in said line interior information storage means;

instructing said chip-managing computer to perform mapping to determine coordinates of chips formed on wafers according to a plurality of kinds of information inputted from said first terminal;

instructing said chip-managing computer to number chips for which said mapping has been performed, to correlate the device names with their respective numbers, and to create map information; and storing said map information in said chip information storage means.

4. A method of processing chips in a lot by a chip-managing system as set forth in claim 1 or 2, said method comprising the steps of:

instructing said host computer to recognize lot information from lot numbers given to chips in a lot introduced into said processing apparatus and instructing said chip-managing computer to search for device names of chips formed on wafers in said lot and for positions of the chips on said wafers, using chip numbers as keywords;

instructing said host computer to read device names corresponding to said chip numbers, to search for process names for the chips using said device names, and to fetch processing information;

sending said processing information fetched by said host computer to said processing apparatus or to said line terminal as processing information; and causing said processing apparatus to process chips formed on the wafers in said lot according to said processing information.

* * * * *